(12) United States Patent
Harris, III et al.

(10) Patent No.: US 9,331,772 B2
(45) Date of Patent: May 3, 2016

(54) QUICK RE-CONNECT DIVERSITY RADIO SYSTEM FOR COMMUNICATING PATIENT DATA OUT OF A SHIELDED MR ROOM

(75) Inventors: Otis Robert Harris, III, Orlando, FL (US); Robert Harwell, Saint Cloud, FL (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 240 days.

(21) Appl. No.: 13/502,573

(22) PCT Filed: Oct. 14, 2010

(86) PCT No.: PCT/IB2010/054658
§ 371 (c)(1),
(2), (4) Date: Apr. 18, 2012

(87) PCT Pub. No.: WO2011/058458
PCT Pub. Date: May 19, 2011

(65) Prior Publication Data
US 2012/0215092 A1    Aug. 23, 2012

Related U.S. Application Data

(60) Provisional application No. 61/260,865, filed on Nov. 13, 2009.

(51) Int. Cl.
*A61B 5/00* (2006.01)
*H04B 7/12* (2006.01)
*H04B 7/06* (2006.01)
*H04B 7/08* (2006.01)
*A61B 5/055* (2006.01)

(52) U.S. Cl.
CPC ............... *H04B 7/12* (2013.01); *H04B 7/0602* (2013.01); *H04B 7/082* (2013.01)

(58) Field of Classification Search
None
See application file for complete search history.

(56) References Cited

U.S. PATENT DOCUMENTS 5,097,484 A * 3/1992 Akaiwa .......................... 375/267
5,442,659 A    8/1995 Bauchot et al.
5,983,112 A   11/1999 Kay
6,345,066 B1  2/2002 Haartsen
6,922,549 B2 * 7/2005 Lyons et al. ................ 455/67.13

(Continued)

FOREIGN PATENT DOCUMENTS

EP    1363410 A1   11/2003
EP    1205038 B1    9/2008

(Continued)

*Primary Examiner* — Long V Le
*Assistant Examiner* — Kevin Pontius

(57) ABSTRACT

An RF shielded room (14) which houses a magnetic resonance scanner (12) also houses a patient monitor (20) which includes a plurality of sensors (18) which collect physiological data about a patient undergoing a magnetic resonance examination. The monitor includes a transmitter (46) which transmits the physiological data on at least two frequency channels of a broadband frequency spectrum. A communication unit (26) located outside the RF shielded room includes first and second receivers (54, 58) which receive the physiological data from the monitor on the first and second frequency channels, respectively. A processor (62) combines physiological data received by the first and second receivers to. A display (32) displays the combined physiological data. A switch (56) switches antenna connections of the receivers (54, 58) responsive to detection of multipath fade.

12 Claims, 6 Drawing Sheets

(56) References Cited

U.S. PATENT DOCUMENTS

| | | | |
|---|---|---|---|
| 7,221,159 B2 * | 5/2007 | Griffiths et al. | 324/318 |
| 7,991,063 B2 * | 8/2011 | Khan et al. | 375/260 |
| 2002/0062068 A1 * | 5/2002 | Gritzbach et al. | 600/300 |
| 2003/0224729 A1 * | 12/2003 | Arnold | 455/59 |
| 2004/0087282 A1 * | 5/2004 | Ishikawa | 455/101 |
| 2006/0206024 A1 * | 9/2006 | Weeks | A61B 5/0006 600/418 |
| 2007/0030116 A1 | 2/2007 | Feher | |
| 2007/0032832 A1 * | 2/2007 | Feher | 607/32 |
| 2009/0073870 A1 | 3/2009 | Haartsen et al. | |
| 2009/0076461 A1 * | 3/2009 | Susi et al. | 604/246 |
| 2009/0115549 A1 | 5/2009 | Lee | |
| 2009/0140739 A1 | 6/2009 | Bennett | |
| 2010/0003941 A1 | 1/2010 | Kojima | |
| 2010/0049799 A1 * | 2/2010 | Nesse et al. | 709/204 |
| 2011/0077675 A1 * | 3/2011 | Rofougaran | 606/189 |

FOREIGN PATENT DOCUMENTS

| | | |
|---|---|---|
| JP | 6164555 A | 6/1994 |
| JP | 2002185355 A | 6/2002 |
| JP | 2002232318 A | 8/2002 |
| JP | 2002246939 A | 8/2002 |
| JP | 2005252919 A | 9/2005 |
| JP | 04326373 B2 | 9/2009 |
| WO | 2008010299 A1 | 1/2008 |
| WO | 2009070417 A1 | 6/2009 |

* cited by examiner

FIG. 3-I

| FIG. 3-I |
| FIG. 3-II |
| FIG. 3-III |

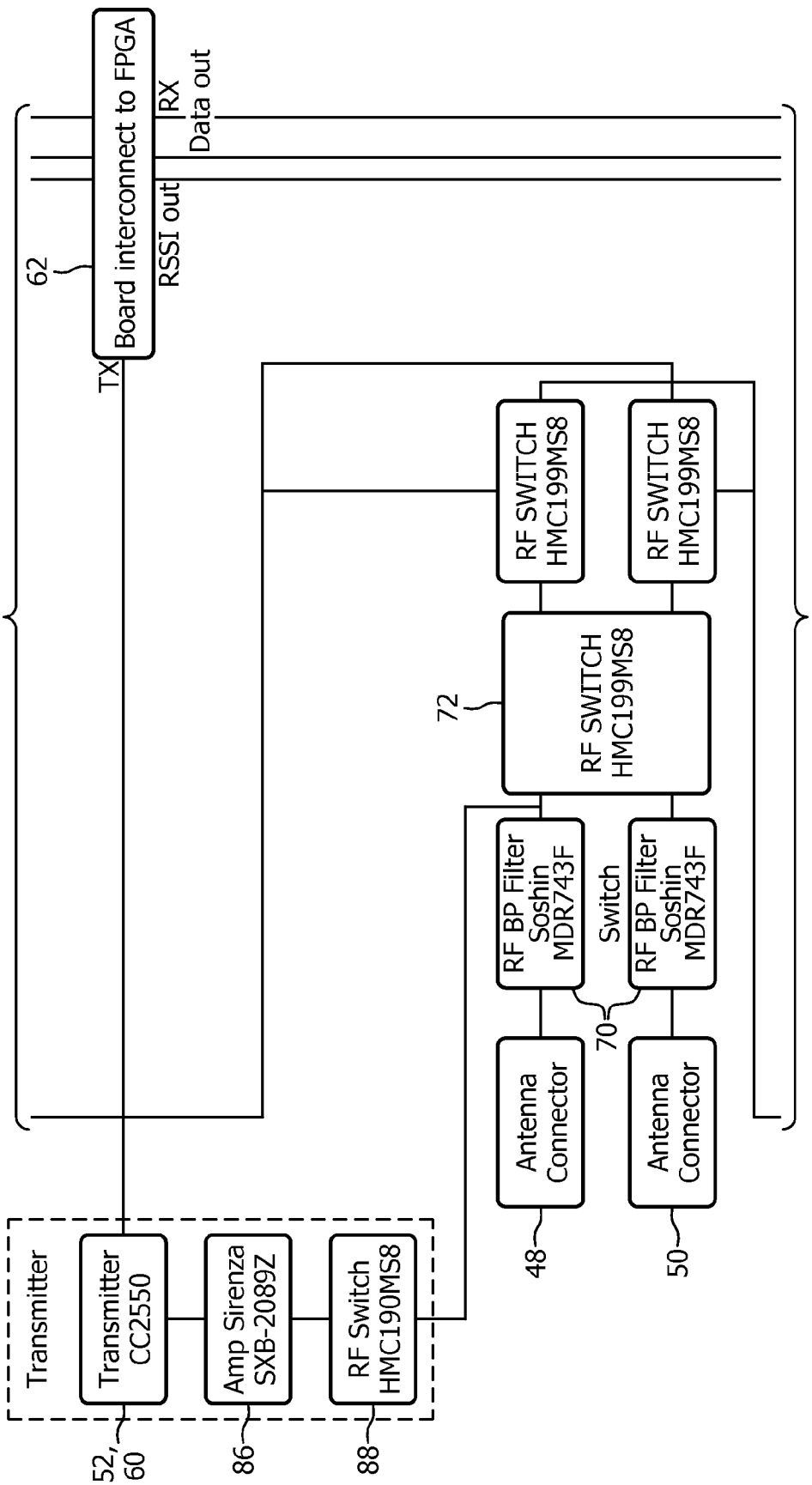

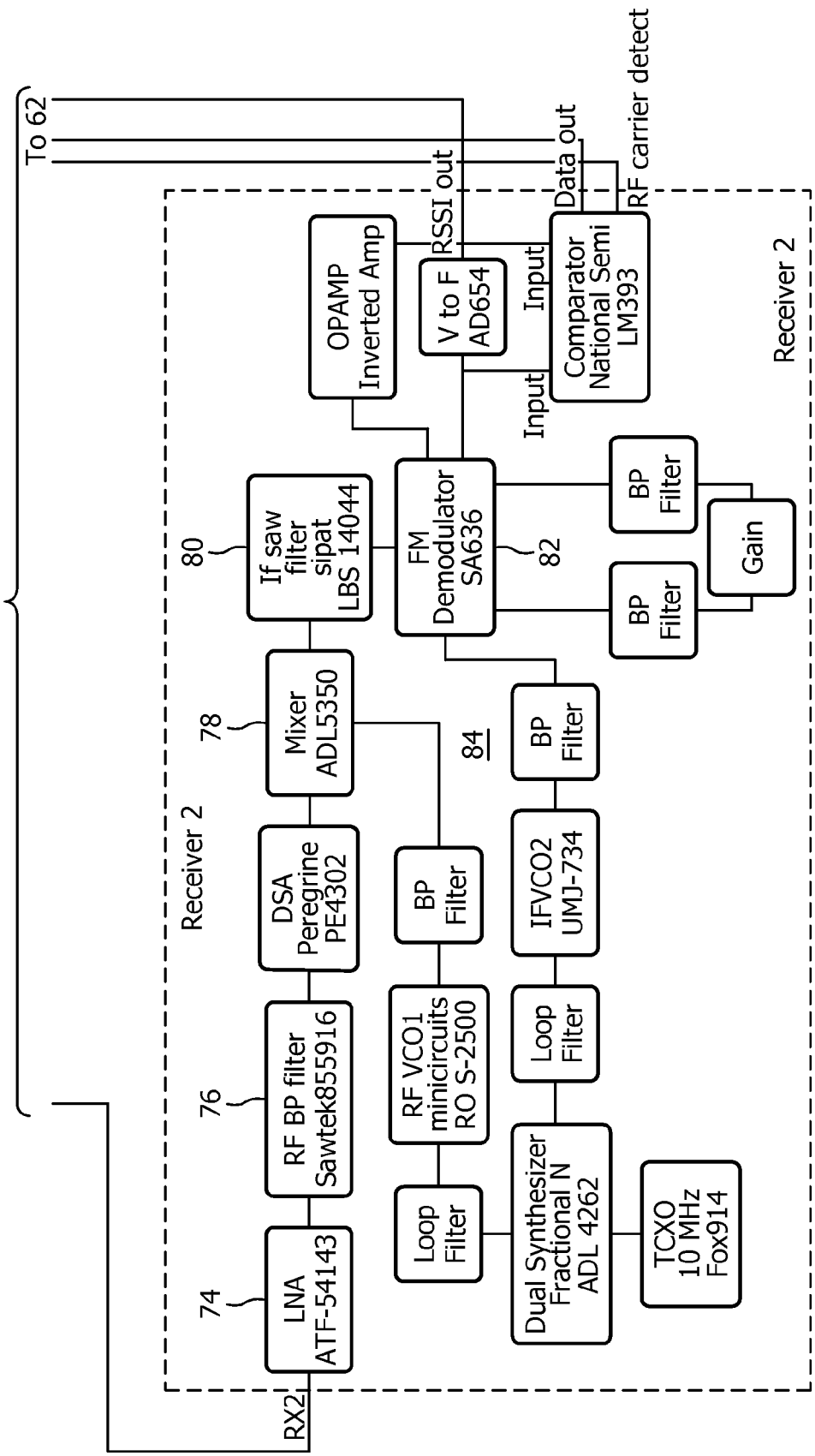
FIG. 3-II
FIG. 3-III

QUICK RE-CONNECT DIVERSITY RADIO SYSTEM FOR COMMUNICATING PATIENT DATA OUT OF A SHIELDED MR ROOM

CROSS REFERENCE TO RELATED APPLICATIONS

This application claims the benefit of U.S. provisional application Ser. No. 61/260,865 filed Nov. 13, 2009, which is incorporated herein by reference.

The present application relates to wireless data communication. It finds particular application in improving the reliability of wireless data communications in adverse environments, particularly within an RF shielded room and will be described with particular reference thereto.

Magnetic resonance (MR) imaging systems use relatively strong RF pulses to induce relatively weak magnetic resonance signals. Typically, these signals are in the megahertz range, which range overlaps the frequency ranges commonly used for other purposes, such as communications, timing oscillators in electronic equipment, and the like. To prevent ambient signals from being received with the resonance signals changing the apparent information conveyed and to prevent the RF excitation signals from interfering with nearby electronic equipment, magnetic resonance imaging systems are frequently placed in a faraday cage or an RF shielded room. RF shielded MR rooms are an extremely difficult radio communication environment. There is significant radio signal degradation due to reflection and attenuation from the RF shielded walls. For example, reflected signals, multiple reflected signals, and line of sight signals received concurrently at an antenna can destructively interfere or can constructively interfere with each other.

During an MR imaging session, the patient is often wired with electrocardiograph (ECG) electrodes, a $SpO_2$ pulse oximeter sensor, or the like. Connecting these physiological parameter monitors to a display in a control room outside the RF shielded room by wires creates long wiring runs, as well as clutter in the shield room. Plus, an RF shielded port is needed to prevent RF leakage through the port for the wires. A wireless solution would be preferable, but reliability is an issue. Others have proposed using wireless communications at a frequency well displaced from the MR frequency. An antenna inside the room is in wireless communication with a display of a medical monitor in the control room. But, any loss of the signal, e.g. due to destructive interference, communicated to the medical monitor typically results in a flat line being displayed on the medical monitor display, which misrepresents the physiological state of the patient. Flat line displays are typically associated with a cessation of the monitored psychological parameter, which typically indicates a serious, life threatening physiological condition. Accordingly, unlike in some other wireless communication systems, in MR applications even a brief loss of communication is problematic.

Frequency hopping spread spectrum radios, which have been used in other applications, switch among many frequency channels. Because constructive and destructive interference occurs only in a limited portion of the spectrum at any one time, spread spectrum communications can suppress or eliminate signal losses due to destructive interference, noise, or other channel problems. However, synchronization issues exist when jumping between frequencies, since the remote receiver should accurately follow the frequency hops employed by the transmitter. If synchronization is lost, there is a brief loss of communication during the resynchronization phase, which in MR applications can again lead to interruptions in the data and flat lining on the display.

The present application provides a new and improved wireless communication system which overcomes the above-referenced problems and others.

In accordance with one aspect, a system is provided for communicating patient data. A patient monitor which is located in an RF shielded room includes a plurality of sensors that collect physiological data about a patient and at least one transmitter which alternatively transmits the physiological data on at least two frequency channels of a broadband frequency spectrum. A communication unit, which is located outside the RF shielded room, includes a first receiver configured to receive physiological data from the patient monitor on a first of the frequency channels and a second receiver configured to operate concurrently with the first receiver to receive physiological data from the patient monitor on a second of the frequency channels. The communication unit further includes a processor communicating with the first and second receivers to combine physiological data received by the first and second receivers to generate a received physiological data stream. A display displays the received physiological data stream.

In accordance with another aspect, a method of communicating patient data is provided. Patient data is alternatingly transmitted from inside an RF shielded room at a first RF frequency channel and a second RF frequency channel. The patient data transmitted in the first RF frequency channel is received with a first receiver outside the shielded room. The patient data transmitted in the second frequency channel is received with a second receiver outside the RF shielded room. The patient data received by the first and second receivers are combined and displayed.

In accordance with another aspect, a communication unit includes: a plurality of receivers receiving digital data at different respective radio frequencies; a processor configured to combine digital data received by the plurality of receivers to generate a received digital data stream; a plurality of antennas; and a switch configured to connect the plurality of antennas with the plurality of receivers using a selectable configuration of antenna/receiver pairings. The processor is further configured to cause the switch to select a different selectable configuration of antenna/receiver pairings responsive to detection of signal fade on at least one of the plurality of receivers.

One advantage resides in reliable wireless data communication.

Another advantage resides in quicker and more reliable reconnection in the event of lost communication.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

The present application uses a combination of a wideband digital technique and a frequency hopping technique. A relatively narrow wide band is defined and divided by frequency into a plurality of channels, two in the illustrated embodiment. A discrete RF receiver (and optionally transmitter) is provided for each channel. The signal received on each channel is monitored and the system hops between or among the channels to receive the strongest signal.

Figure 1:
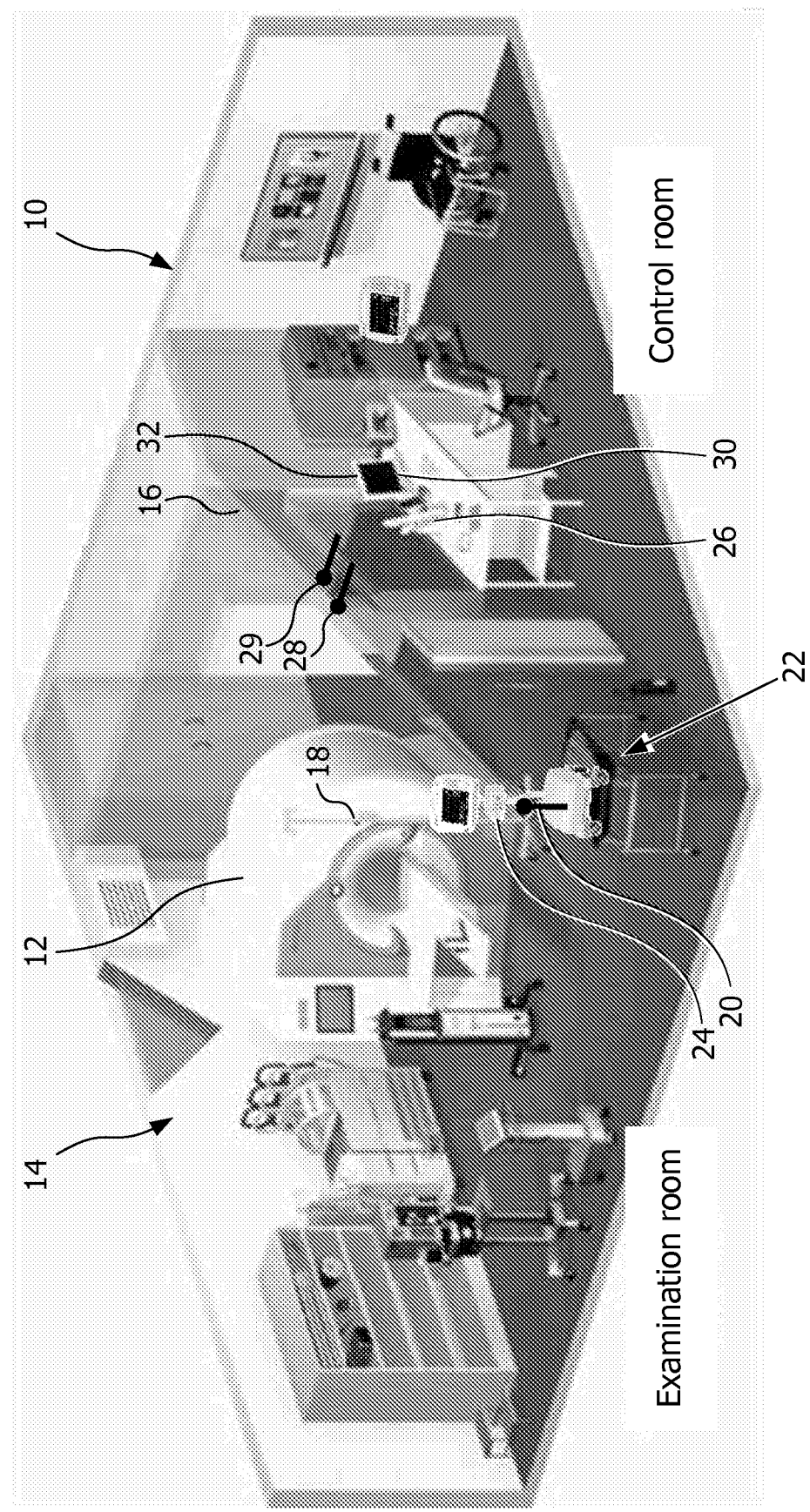
FIGS. 1 and 2 are diagrammatic illustrations of a communication system in accordance with the present application.

With reference to FIG. 1, illustrated is a MRI control room 10 for controlling the operation of an MRI scanner 12 located adjacent an RF shielded MRI examination room 14. RF shielding 16 is achieved by enclosing the room with copper sheeting, metal foil, plasma, high metallic content (e.g. metal mesh) glass, or other suitable conductive layers such as wire mesh. The MRI scanner 12 that images a patient (not shown) has one or more remote medical devices 18 that measure physiological parameters of the patient and generate physiological data indicative thereof. These remote medical devices 18 include electrocardiograph (ECG) sensors, intravenous (IV) fluid pumps, blood pressure sensors $SpO_2$ sensors, pulse sensors, thermometers, respiratory sensors, exhaled gas sensors, or so forth. Other remote medical devices 18 can be associated with a patient, and not all of the above-mentioned remote medical devices 18 have to be associated with a patient at any given time. As used herein, medical devices signifies data sources indicating patient health, or the like.

The remote medical devices 18 report the measured or other physiological data to a patient monitor 20 also located within the MRI exam room 14. The patient monitor 20 serves as a gathering point for the physiological data measured by the remote medical devices 18, and provides temporary storage for the data. The patient monitor 20, for example, may be a patient's bedside monitor, a monitor that travels with the patient, such as the transmitter of an ambulatory patient worn monitoring system, or the like. The patient monitor 20 may also be a more permanent fixture, such as a wall-mounted monitor that is permanently associated with each bed or a room. The communication links between the remote medical devices 18 and the patient monitor 20 may be fiber optic, wireless, hard wired, or a combination. Similarly, the patient monitor may be powered by battery, external AC power, or a combination of both.

The patient monitor 20 is connected with an examination room communication unit 22 that transmits the measured physiological data wirelessly. The physiological data can be transmitted continuously or periodically. For a given patient, some data may be transmitted continuously, such as EGG, or other data, such as blood pressure, periodically. The examination room communication unit 22 includes an antenna 24 to communicate the measured physiological data wirelessly to a control room communication unit 26 and receive signals from the control room communication unit. It should also be appreciated that while only one antenna 24 is illustrated on the examination room communication unit 22, more antennas are contemplated. In the illustrated embodiment, the monitor includes a display 27 which displays the physiological data to an attendant in the shielded room.

The control room communication unit 26, in the illustrated embodiment, includes two radio antennas 28, 29 extending through the RF shield 16 to receive the measured physiological data from the examination room communication unit 22. The control room communication unit antennas 28, 29 are positioned, for example, on the RF shielded wall 16 of the MRI examination room 14. It should also be appreciated that while the control room communication unit antennas 28, 29 are illustrated being positioned on the RF shielded wall 16 of the MRI examination room 14, positioning the control room communication unit antennas within the MRI control room 10 is contemplated when the communication frequency and the shield configured is such that the signals pass through the shield into the control room. Additionally, it should also be appreciated that while only two antennas 28, 29 are diagrammatically illustrated, more antennas are contemplated. The control room communication unit 26 sends the measured physiological data to a MRI control unit 30 that controls the operation of the MRI scanner 12. The MRI control unit 30 also includes a display 32 on which the measured physiological data received from the patient via the patient monitor 20 is displayed as well as information relating to the MR scanner. Alternatively, separate monitors are provided.

Figure 2:
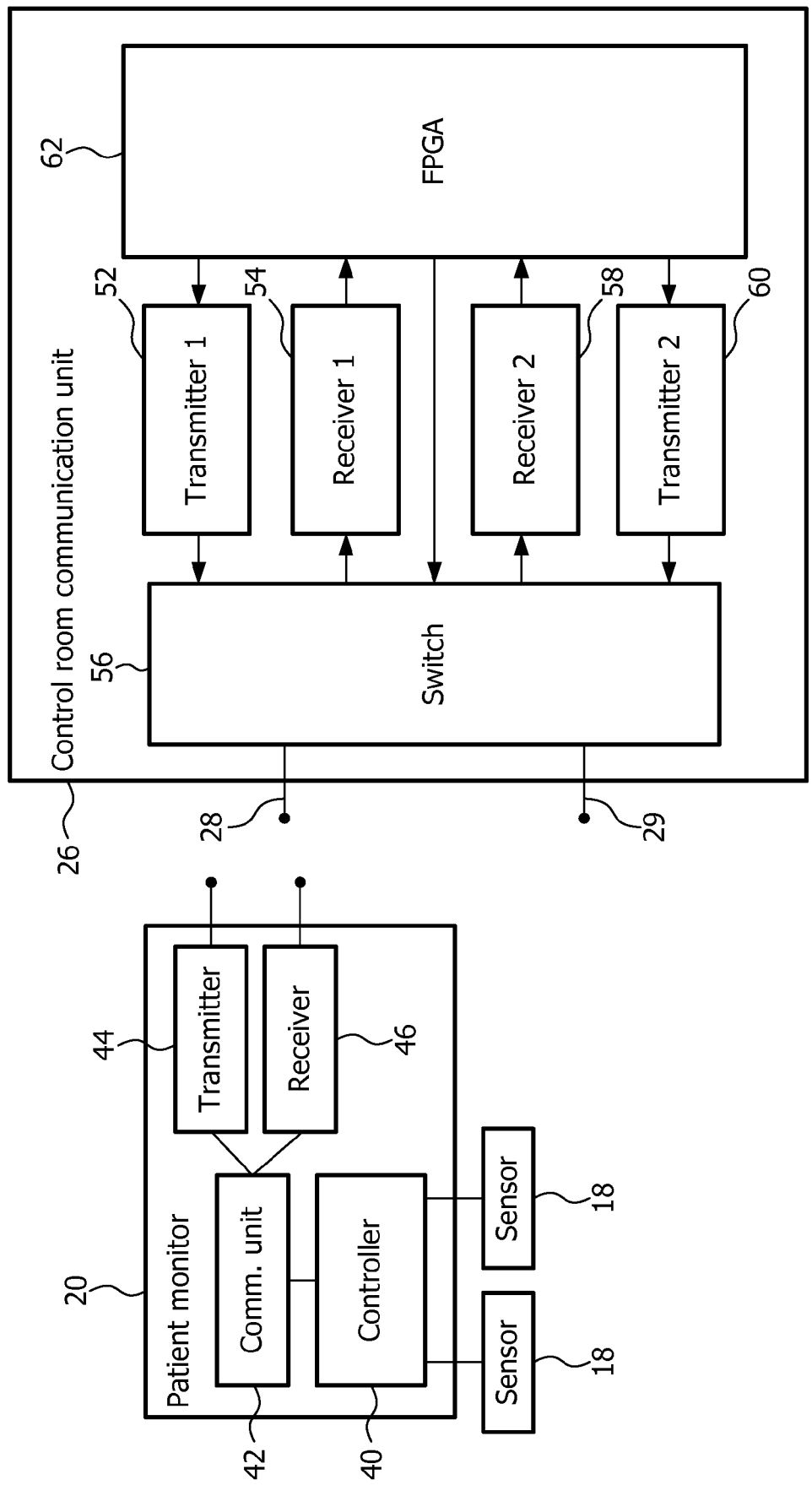

With reference to FIG. 2, the patient monitor 20 is illustrated as connected to two remote medical devices 18, e.g. sensors, which sense the patient's physiological data. It should be appreciated that while only two remote medical devices 18 are illustrated, more remote medical devices are contemplated. The collected physiological data is transmitted to a controller 40, concurrently in the patient monitor 20. An examination room communication unit 42 controls a transmitter 44 to transmit the physiological data, received by the controller 40, at multiple frequencies to the control room communication unit 26. More specifically, the communication unit 42 alone or in combination with the controller, assembles the physiological data into digital data packets which are optionally partially redundant. Each data packet includes a current data segment, optionally along with redundant data comprising one or more previous data segments retrieved from a data buffer of the communication unit or the controller. The inclusion of previous data packets enables any data segment that might be lost if the signal becomes weak or during re-synchronization follows a switch between frequency channels to be recovered from a subsequent data packet. The examination room communication unit 42 also controls a receiver 46 to receive data and control information transmitted from the control room communication unit 26. The receiver 46 can receive instructions to retransmit data packets, change frequencies or frequency channels, and other control data.

The control room communication unit 26 is in wired connection with the two antennas 28, 29 to receive the physiological data and, optionally, to transmit patient monitor data to the patient monitor 20. The first antenna 28 is connected to a first transmitter 52 and a first receiver 54, both operating at a first radio frequency, through a switch 56. Additionally, the second antenna 29 is connected to a second receiver 58 and a second transmitter 60, both operating at a second radio frequency different from the first radio frequency, through the switch 56. However, the switch 56 also enables these connections to be switched, that is, by switching the switch 56, the first antenna 28 can alternatively be connected with the second transmitter 60 and second receiver 58 and the second antenna 29 connected with the first transmitter 52 and first receiver 54. By having two separate antennas 28, 29, there are two redundant alternative spatial paths by which the physiological data transmitted by the patient monitor 20 can be received. The two receivers 54, 58 operate concurrently at first and second different radio frequencies while the transmitter 44 of the patient monitor 20 transmits alternately at either the first radio frequency or the second radio frequency. In this way, operation analogous to frequency hopping is achieved, albeit with the switching limited to two frequencies. Advantageously, since both receivers 54, 58 operate concurrently to receive whichever radio frequency the transmitter 44 is currently outputting, there is no need for synchronization of the hopping between the transmitter 44 and the (dual) receiver 54, 58. The control room communication unit 26 receives either the transmission at the first radio frequency using the receiver 54, or the transmission at the second radio frequency using the receiver 58. This mode of operation is referred to herein as an abridged hopping scheme, and provides the principal advantages of frequency hopping without the cost of synchronization circuitry or the risk of signal loss due to loss of synchronization. It will be appreciated that although only two receivers 54, 58 supporting abridged frequency hopping between two (i.e., first and second) frequencies is illustrated, extension to a third, fourth, or more frequencies is achievable by adding a third, fourth, or more receivers operating at third, fourth, or more frequencies.

The frequency diversity provided by the abridged hopping scheme advantageously reduces likelihood of signal loss due to a problem with one of the channels. Another potential problem is the possibility that destructive interference could cause signal dropout on one of the receivers. In the MR setting destructive interference can result from multiple transmission paths typically introduced by reflections from the rf shielding. The potential for destructive interference is addressed in the illustrated embodiment by responding to a low signal level on one of the receivers 54, 58 by switching between the antennas 28, 29 so as to change the path lengths. The antennas 28, 29 are spatially diverse in that the path lengths to the two antennas 28, 29 are generally different. Although operation in which the communication unit 26 operates in receive mode is described herein, it will be appreciated that, by having two separate transmitters 52, 58, there are also two switchable separate paths by which data can be transmitted from the communication unit 26 to the patient monitor 20. Transmission from the communication unit 26 to the patient monitor 20 can also use the abridged hopping scheme disclosed herein, by making the receiver 46 a dual-frequency receiver analogous to the dual receiver 54, 58 of the communication unit 26. The first 52 and second 58 transmitters, as well as the first 54 and second 60 receivers, are connected to a processor 62, which in the illustrated embodiment is a field programmable gate array (FPGA). Alternatively, the processor 62 can be a microprocessor, microcontroller, application-specific integrated circuit (ASIC), or so forth. The processor 62 receives and combines physiological data received by the first receiver 54 at the first radio frequency and by the second receiver 58 at the second radio frequency, as well as transmits data to the patient monitor 20 using the first 52 and second 60 transmitters. The processor 62 also disables the first 52 and second 58 transmitters when physiological data is being received by either the first 54 or second receivers 60, and optionally analogously switches out or disables the receivers 54, 58 during the transmit phase. Since the transmitter 44 of the patient monitor 20 transmits alternately at either the first radio frequency or the second radio frequency, but never transmits at both frequencies simultaneously, the processor 62 can combine the physiological data received by the first and second receivers 54, 58 by adding the demodulated and decoded physiological data signals as a function of time from the first and second receivers 54, 58 to generate the received physiological data stream. This combined data stream is expected to be continuous in time without interruptions, except at any intervals during which the patient monitor 20 is not transmitting physiological data.

To address the multipath fade problem, the processor 62 controls the switch 56 to selectively switch between: (i) a first configuration in which the first antenna 28 feeds into the first receiver 54 and the second antenna 29 feeds into the second receiver 58; and (ii) a second configuration in which the first antenna 28 feeds into the second receiver 58 and the second antenna 29 feeds into the first receiver 54. This exchange of the antennas 28, 29 between the two receivers 54, 58 is done responsive to a low signal from one of the receivers 54, 58 which may indicate a destructive interference condition for the receiver exhibiting a low signal. For example, suppose the switch 56 is set in the first configuration (i), and there is destructive interference for the first antenna 28 feeding into the first receiver 54. In configuration (i) antenna 28 is operating at the first radio frequency. After switching to configuration (ii), the first antenna 28 is now operatively connected with the second receiver 58, and hence is now operating at the second radio frequency. Since the second radio frequency has a different wavelength compared with the first radio frequency, the path lengths are changed and so the destructive interference condition is removed. Because the (dual) receiver 54, 58 has a wideband digital bandwidth, the wavelengths of the first and second radio frequencies are different but relatively close (for example, not having a ratio of 2:1 or 3:2 or so forth) and so the likelihood is quite low that the destructive interference at the first radio frequency will also be present at the different (but relatively close) second radio frequency. Any spatially different antenna (including the different antennas 28, 29) will have a different multipath profile. By exchange antennas, the antenna count is kept low; however, more generally any switch to a different spatial antenna would be suitable for correcting a multipath fade condition.

The two receivers 54, 58 operate concurrently, and the processor 62 combines physiological data received from the first 54 and second 58 receivers to generate the received physiological data stream. The processor 62 is configured to execute software for performing the operations described herein.

Figure 3:
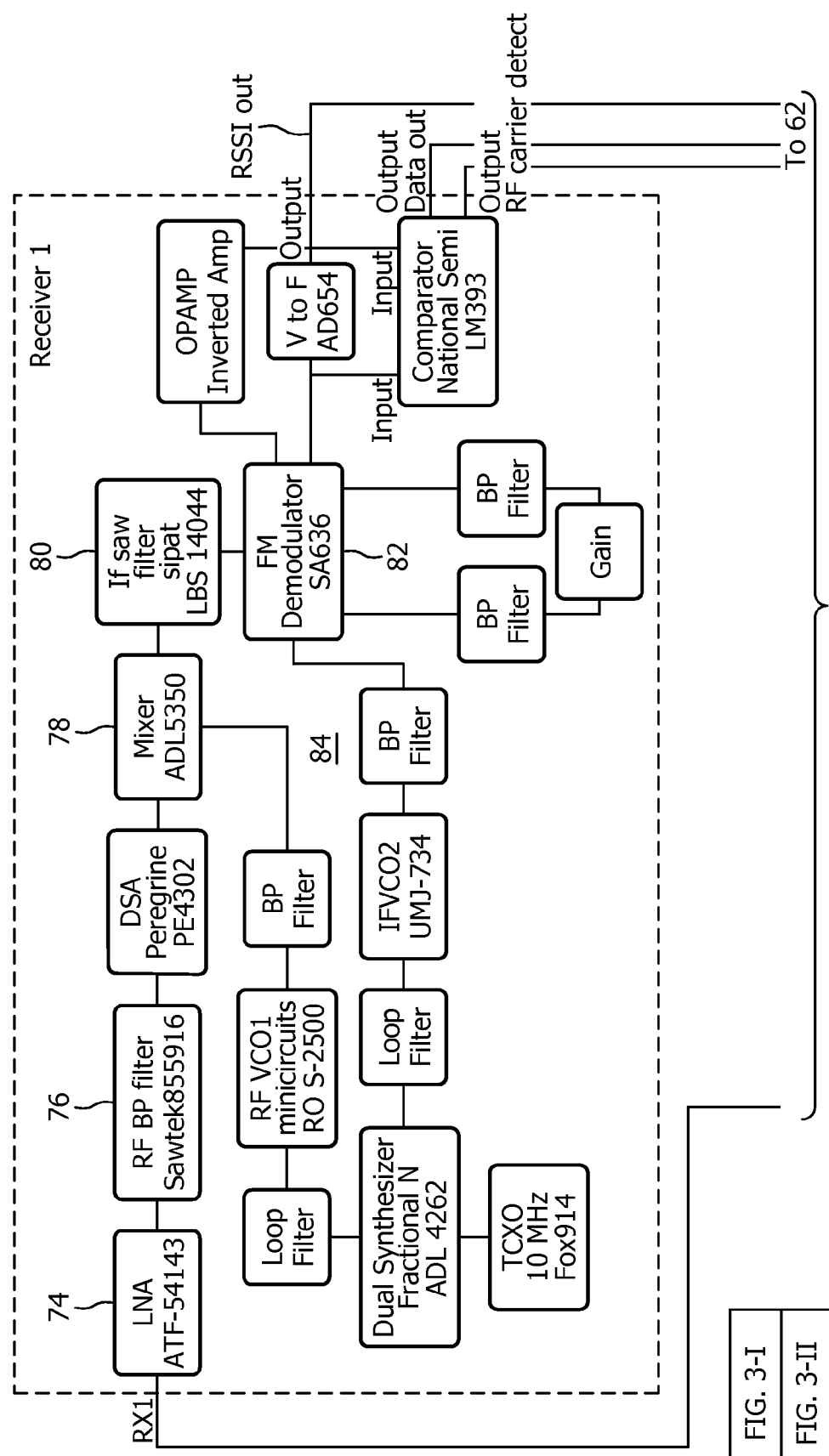
FIG. 3 is a diagrammatic illustration of a communication system in accordance with the present application; and, FIG. 4 is a flowchart diagram of the operation of the communication unit in accordance with the present application.

With reference to FIG. 3, illustrated is a diagram of one embodiment control room communication unit. The antenna connectors 48, 50 are suitably connected in wired fashion to respective antennas 28, 29. The multiple antenna connectors 48, 50 are connected to the switching unit 56 that is responsible for swapping the antennas between configuration (i) and configuration (ii) as described with reference to FIG. 2. The switching unit 56 includes RF band Pass Filters 70, such as ISM band 2.4 GHz SAW filters, or the like, that filter out frequencies outside of a preselected band of frequencies.

The first 54 and second 58 receivers provide two separate receive chains with matching components that function identically, except being configured to receive at different first and second respective radio frequencies. The receivers 54, 58 each include a low noise amplifier 74 to improve reception of small signals through amplification as well as other RF band Pass Filters 76. Mixers 78 in the receivers 54, 60 down convert the 2.4 GHz signal to an intermediate frequency of 140 MHz. A 1 MHz wide IF SAW filter 80 having a center frequency of 140 MHz rejects all spurious responses created by the mixer 78. The receivers 54, 58 also include a Digital Step Attenuator to regulate the input signal going into a FM demodulator 82 within a range of, for example, −40 dBm to −90 dBm. The FM demodulator 82 down converts the 140 MHz signal to a second intermediate frequency of 10.7 MHz which is then interpreted by the processor 62. A Phase Lock Loop 84 is also included in the receiver and is a conglomeration of several parts including a Fractional N dual frequency synthesizer, a temperature compensated crystal oscillator (TCXO) reference oscillator, RF and IF pile loop filters, RF and IF Voltage Controlled Oscillators. The radio system also includes a transmitter 52, 58 that is controlled by the switching unit 56. The transmitter 52, 60 interfaces to a variable gain amplifier 86 to manage the transmit power of the transmitter. The transmitter 52, 60 also includes an RF switch 88 so that it is able to transmit a signal to either one or both antennas 28, 29.

The intermediate frequencies and other parameters and components referenced in the description of the control room communication unit shown in FIG. 3 are by way of example, and it is to be understood that other operating frequencies, electronic components, and so forth can also be used.

To implement the spatial diversity aspect, the processor 62 determines whether there is a receive multipath problem (suitably indicated, for example, by a low signal on one of the receivers 54, 58) and, if so, switches from configuration (i) having first antenna 28 feeding first receiver 54 and second antenna 29 feeding second receiver 58 to configuration (ii) having first antenna 28 feeding second receiver 58 and second antenna 29 feeding first receiver 54.

In the illustrated embodiment, there are two receivers 54, 58 and two antennas 28, 29. However, including more than two antennas is also contemplated. For example, if there are three antennas (e.g., Am, An, Ap), then for example the following switchable configurations of antenna/receiver pairings can be employed: configuration (i)=Am/first receiver, An/second receiver; configuration (ii)=An/first receiver, Ap/second receiver; and configuration (iii)=Ap/first receiver, Am/second receiver.

Spatial diversity can be extended to a larger number of radio frequencies. For example, if there are three receivers (e.g., Rm, Rn, Rp) and three antennas (e.g., Am, An, Ap), then for example the following switchable configurations of antenna/receiver pairings can be employed: configuration (i)=Am/Rm, An/Rn, Ap/Rp; configuration (ii)=An/Rm, Ap/Rn, Am/Rp; and configuration (iii)=Ap/Rm, Am/Rn, An/Rp.

Figure 4:
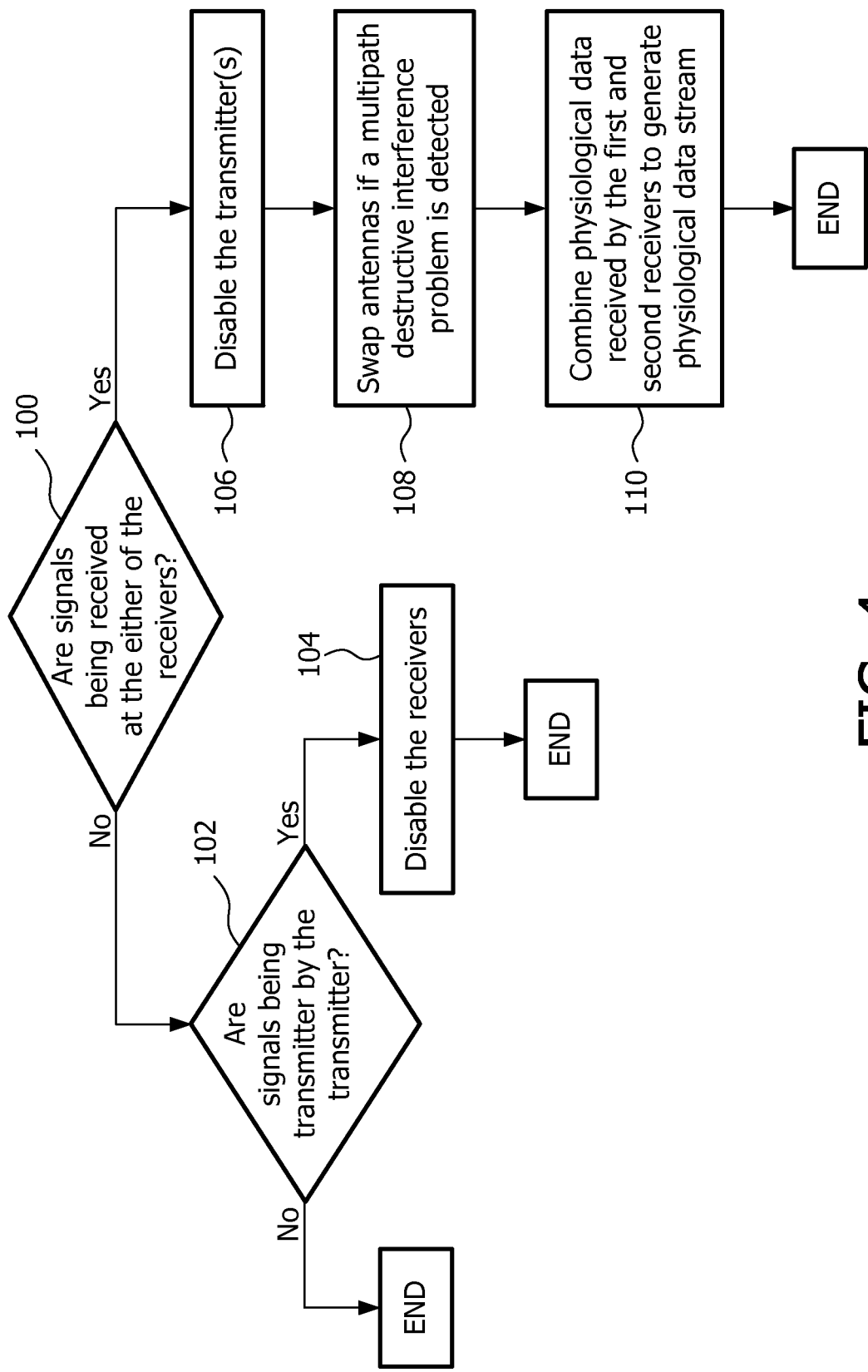

With reference to FIG. 4, illustrated is a flowchart diagram of the operation of the wireless communication system 26 under the control of the processor 62. In a step 100, it is determined if a signal is being received at either of the two receivers 54, 58. In response to a signal not being received by either of the two receivers, it is determined if the signal is being transmitted by one of the transmitters 52, 60 in a step 102. In response to the signal being transmitted by one of the transmitters 52, 60, the two receivers 54, 58 are disabled in a step 104. In response to the signal being received at either of the two receivers, the transmitters 52, 60 are disabled in a step 106. In a step 108, the processor 62 determines if a multipath destructive interference condition exists for one of the receivers, and if so swaps the antennas 28, 29, so as to implement spatial diversity. In a step 110, the processor 62 combines the physiological data received by the first and second receivers 54, 58 to generate the received physiological data stream, which is expected to be continuous in time without interruptions for as long as the patient monitor 20 is transmitting.

The processor 62 uses the known data speed and bit length to determine a clock. The clock is used to synchronize the redundant data streams received concurrently by the two receivers 54, 58. To determine a receiver is receiving a weak signal in one embodiment, the processor 62 determines using the clock if the data packets are being received on time. Because each data packet includes previous data segments, the processor 62 can use the previous data segments to replace any data lost when switching between receivers and resynchronizing. By combining the physiological data received by the first and second receivers 54, 58, the processor 62 outputs a continuous and complete data stream to the monitor in the control room for display on the display 32, storage in local memory, or in a central database, and the like.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A system for communicating physiological data, the system comprising:
   a plurality of remote medical devices configured to sense physiological data about an associated patient disposed in a radio frequency (RF) shielded room RF shielded by an RF shield;
   a patient monitor configured to collect the physiological data from the remote medical devices and located within the RF shielded room, the patient monitor including:
      at least one transmitter which defines a wideband frequency spectrum divided by frequency into at least two frequency channels and which alternately transmits the physiological data alternately on the at least two frequency channels of a broadband frequency spectrum;
   a first communication unit located outside the RF shielded room, the first communication unit including:
      a first receiver configured to receive physiological data from the patient monitor on a first of the frequency channels;
      a second receiver configured to receive physiological data from the patient monitor on a second of the frequency channels;
      a first processor communicating with the first and second receivers to process physiological data received by the first and second receivers to generate a received physiological data stream;
   first and second antennas extending from outside the RF shielded room through the RF shield to be disposed at least partially inside the RF shielded room; and
   a switch configured to switch between a first configuration in which the first antenna feeds the first receiver and the second antenna feeds the second receiver and a second configuration in which the first antenna feeds the second receiver and the second antenna feeds the first receiver;
   wherein the first processor is further configured to operate the switch responsive to detection of a multipath destructive interference fade condition; and
   a display which displays the received physiological data stream.

2. The system according to claim 1, wherein the patient monitor further includes:
   an RF shielded room communication unit and controller configured to digitize the physiological data and assemble the digitized physiological data into data packets, each data packet including a current segment of physiological data and at least one previous segment of physiological data.

3. The system according to claim 2, wherein the first processor is further configured to:
   synchronize data packets received from the first and second receivers to generate the received physiological data stream with no redundant data.

4. The system according to claim 1, further including:
   a magnetic resonance (MR) scanner disposed in the RF shielded room and configured to image the patient associated with the remote medical devices.

5. The system according to claim 1, wherein the patient monitor includes:

a display which displays the physiological data to an attendant in the RF shielded room.

6. A system for communicating physiological data, the system comprising:
a patient monitor configured to be located within a radio frequency (RF) shielded room, the patient monitor including:
a plurality of sensors configured to collect physiological data about a patient; and
at least one transmitter configured to alternately transmit the physiological data on at least two frequency channels of a broadband frequency spectrum alternately;
a first communication unit located outside the RF shielded room, the first communication unit including:
a first receiver configured to receive physiological data from the patient monitor on a first of the frequency channels;
a second receiver configured to receive physiological data from the patient monitor on a second of the frequency channels;
at least one first transmitter configured to transmit control data to a third receiver disposed in the patient monitor;
a first processor communicating with the first and second receivers and configured to process physiological data received by the first and second receivers to generate a received physiological data stream and to disable the at least one first transmitter in response to either one of the first or second receiver receiving physiological data and disable the first and second receivers in response to the at least one first transmitter transmitting the control data to the third receiver of the patient monitor; and
a display configured to generate a display from the received physiological data stream.

7. A method for communicating physiological data, the method comprising:
collecting physiological data about a patient with a plurality of sensors of a patient monitor located in an RF shielded room;
alternating transmitting the physiological data from inside a radio frequency (RF) shielded room on at least two frequency channels of a broadband spectrum alternately, with at least one transmitter;
receiving the physiological data transmitted from the patient monitor on a first RF frequency channel with a first receiver outside the RF shielded room;
receiving the physiological data transmitted from the monitor on a second RF frequency channel with a second receiver outside the RF shielded room;
with at least one first transmitter, transmitting control data from outside the RF shielded room to a third receiver disposed in the patient monitor;
with a processor configured to communicate with the first and second receivers:
processing the process physiological data received by the first and second receivers to generate a received physiological data stream;
combining patient data received by the first and second receivers; and
disabling the at least one first transmitter in response to either one of the first and second receivers receiving the physiological data; and
disabling the first and second receivers in response to the at least one first transmitter transmitting the control data to the third receiver of the patient monitor;
generating a display on a display device from the received physiological data stream.

8. A communication system comprising:
a plurality of remote medical devices configured to sense physiological data from a patient located within a radio frequency (RF) shielded room;
a patient monitor configured to collect the physiological data from the remote medical devices and be located within the RF shielded room, the patient monitor including:
at least one transmitter configured to transmit the patient data alternately on at least two different respective radio frequency channels of a broadband frequency spectrum;
a plurality of receivers located outside the RF shielded room and configured to receive the patient data transmitted at the different respective radio frequency channels;
a plurality of antennas extending from outside the RF shielded room at least partially through the RF shield into the RF shielded room;
a switch located outside the RF shielded room and configured to connect the plurality of antennas with the plurality of receivers using a selectable configuration of antenna/receiver pairings; and
a processor configured to process patient data received by the plurality of receivers to generate a received patient data stream located outside the RF shielded room, wherein the processor is further configured to cause the switch to select a different selectable configuration of antenna/receiver pairings responsive to detection of signal fade on at least one of the plurality of receivers.

9. The system according to claim 8, wherein the patient monitor is configured to digitize the physiological data and assemble the digitized physiological data into data packets, each data packet including a current segment of physiological data and at least one previous segment of physiological data.

10. The system according to claim 9, wherein the processor is further configured to:
synchronize data packets received from the first and second receivers to generate the received physiological data stream with no redundant data.

11. The system according to claim 10, further including:
a magnetic resonance (MR) scanner disposed in the RF shielded room and configured to image the patient associated with the remote medical devices.

12. The system according to claim 11, further including:
an in-room display disposed within the shielded room and configured to display the collected patient data.

* * * * *